US007965975B2

(12) United States Patent
Venkatachalapathy

(10) Patent No.: US 7,965,975 B2
(45) Date of Patent: Jun. 21, 2011

(54) ON DEMAND, NETWORK RADIO AND BROADCAST METHOD

(76) Inventor: Swetha Venkatachalapathy, Electronics City (IN)

( * ) Notice: Subject to any disclaimer, the term of this patent is extended or adjusted under 35 U.S.C. 154(b) by 1313 days.

(21) Appl. No.: 11/382,029

(22) Filed: May 6, 2006

(65) Prior Publication Data

US 2006/0268920 A1 Nov. 30, 2006

Related U.S. Application Data

(60) Provisional application No. 60/683,458, filed on May 21, 2005.

(51) Int. Cl.
*H04H 20/71* (2008.01)
*H04B 7/00* (2006.01)
*H04B 1/06* (2006.01)

(52) U.S. Cl. ..................... 455/3.01; 455/3.05; 455/66.1; 455/344

(58) Field of Classification Search ................. 455/3.01, 455/3.02, 3.04, 3.05, 3.06, 344, 66.1, 186.1, 455/180.1, 181.1
See application file for complete search history.

(56) References Cited

U.S. PATENT DOCUMENTS 4,461,026 A * 7/1984 Priniski ........................... 381/98
5,577,266 A * 11/1996 Takahisa et al. ............. 455/3.06
6,314,094 B1 * 11/2001 Boys ............................. 370/352
6,608,994 B1 * 8/2003 Wegener et al. ............. 455/3.06
6,928,261 B2 * 8/2005 Hasegawa et al. ........... 455/3.01
7,187,947 B1 * 3/2007 White et al. ............... 455/556.1
7,403,753 B1 * 7/2008 Chan .......................... 455/156.1
7,454,166 B2 * 11/2008 Patsiokas et al. ............ 455/3.06

* cited by examiner

*Primary Examiner* — Tilahun Gesesse
(74) *Attorney, Agent, or Firm* — David Lewis; Marc Balban

(57) ABSTRACT

A network radio is provided that includes a combination of an AM, FM receiver and a network channel capable of receiving streamed audio. Users of this network radio can initiate a search for a particular audio record, when a successful match is found by the online broadcast station, the audio record is streamed to the network radio. The net result will be an on demand radio without the need of any portable media.

23 Claims, 7 Drawing Sheets

Receiving Apparatus 500

BROADCAST STATION 300

Receiving Apparatus 500

ON DEMAND, NETWORK RADIO AND BROADCAST METHOD

CROSS REFERENCE TO RELATED APPLICATIONS

This application claims the benefit of U.S. Provisional Patent Application No. 60/683,458 dated May 21, 2005 and entitled, "eRadio with Modem and eStation with Business Method," by Swetha Venkatachalapathy, which is incorporated herein by-reference.

FIELD

This specification relates to listening to radio.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

The most common methods of receiving audio and/or video are the free public broadcast. The most popular among the free public broadcasts are AM and FM for the radio and VHF/UHF for television broadcast. These conventional methods of receiving Audio/video content do not have the capability of receiving the user's feedback information indicative of a source of the audio and/or video content in real time. Hence the user does not have any control over the content he or she is tuned to. However free public broadcast is still the preferred method to get a live broadcast and the most popular method.

Several subscription based broadcast technologies are available in the last few years. Even though subscription based broadcast services, such as the satellite radio and television broadcasts, provide a wide range of choices they are still incapable of receiving user feed back and responding in real time.

Some cable based broadcast services, when subscribed to, have the limited capability of broadcasting content on demand. However all these subscription based services come with huge subscription fees and a small number of choices.

Currently, in order to play a particular content whenever the user desires to, the user needs to own the content in a portable format, such as a cassette, compact disc, or an audio file, and a playback equipment capable of playing the portable media. The technologies for storing portable media have evolved from the days of gramophone records to the modern day DVD. The quality of the audio and video content has improved along with a significant reduction in the size of the content, enabling users to save huge amounts of audio and video content in small, compact devices. This has led to number of types of media players, which are incompatible with each other. An example of two incompatible media players is a cassette player and a CD player.

Unauthorized duplication of audio and video is a problem and causes revenue loss for copyright owners. The advent of different kinds of portable media which can be played back on a computer, and computer software applications that enable users to easily copy from the portable media, compress and distribute audio/video content has only compounded this problem.

Many Internet based services are available where users can select and play from a collection of content available. The quality of the content is not guaranteed and a computer is always necessary to playback. Some of these services are also subscription based.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION: PREFERRED EMODIMENT

Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

Figure 1:
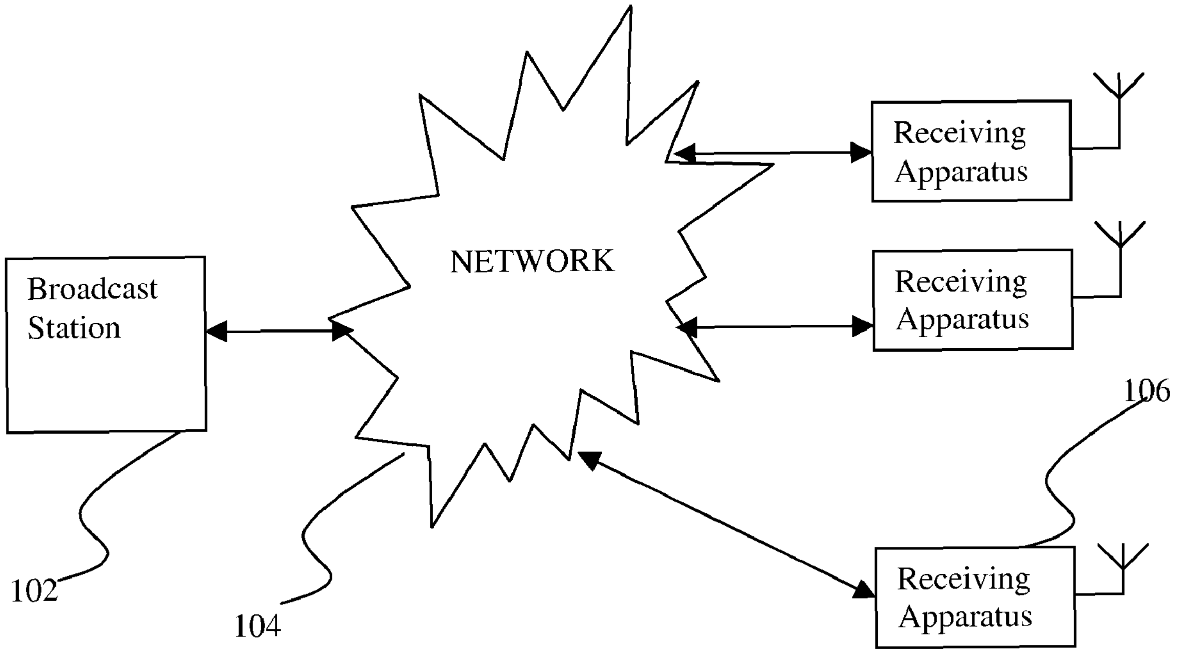
FIG. 1 is a representation of one embodiment of a network having the receiving apparatus and the broadcast apparatus.

FIG. 1 shows an embodiment of a network radio system 100. FIG. 1 shows an example of how receiving equipment (e.g., receiving apparatus 106) and broadcast setup (e.g., broadcast station 102) may work together to provide audio to a listener over a network (e.g., network 104). Anywhere the term broadcast station appears the term broadcast setup may be substituted to obtain other embodiments. In accordance with an embodiment of the present invention the user has a network radio, which may include receiving apparatus 106. In an embodiment, receiving apparatus 106 is capable of tuning to an available free broadcast in addition to having the capability to request for a content, receive and playback the same, in other words has on-demand capability. For example, receiving apparatus 106 may include a combination of a conventional tuner capable of receiving AM and/or FM radio stations, and may be capable of receiving content through a network 104. An On Demand service provider may be located at broadcast station 102, and may host a server capable of receiving and broadcasting the requested content (which may be included within broadcast station 102).

Receiving apparatus 106 may include three audio sources, such as AM, FM and one or more network channels. A network channel may be a collection of user defined presets.

Users can build their own network channels by submitting queries from any of the valid input devices. For example, the preset could be "Best of year 1998." The AM and FM audio sources may receive free broadcasts (free of cost), whereas the network channel may be used to search for particular audio content or a group of sources having similar contents that are available via one or more networks (which may or may not be free). Alternatively, receiver apparatus 106 may be capable of receiving other audio sources that are not free, such as satellite radio. If the search for the particular content is successful, the particular content found may be sent (e.g., streamed), optionally in real time and optionally in an encrypted form, via network 104 to receiving apparatus 106.

After receiving the particular content, if the particular content was encrypted, receiving apparatus 106 may decode particular content from the encrypted format, and reproduce audio for the user to listen to. In an embodiment, using receiving apparatus 106 users may choose a non-subscription or subscription based service and the business providing the service may still get revenue indirectly or directly from the user (e.g., a consumer). In an embodiment, receiving apparatus 106 may provide a means to playback broadcasts without requiring the user to store the broadcasts on a portable media, thereby reducing the desirability of buying a cassette or a Compact Disc (CD).

In an embodiment, receiving apparatus is portable. In an embodiment, software upgrades may be downloaded automatically via network 104 reducing or eliminating the need for the user to manually upgrade software whenever improvements in compression technologies take place.

In an embodiment, the content obtained may be available free if a non-subscription service is chosen, and the cost of buying receiving apparatus 106 and/or commercials may pay for the content provided to the user, which thereby reduces the likelihood of piracy. In an embodiment, broadcast station 102 sends the content requested in encrypted format to receiving apparatus 106, which also reduces the likelihood of piracy. Since receiving apparatus 106 is capable of receiving content from network 104, there is less reason to equip a home computer with hardware (e.g., a sound card and/or video card) capable of handling the audio or video quality of the content. In an embodiment, broadcast station 102 rates audio and/or video subject matter (e.g., songs and movies) according to the number of requests that are received for the content. In an embodiment, royalties are paid based on the ratings.

Figure 2:
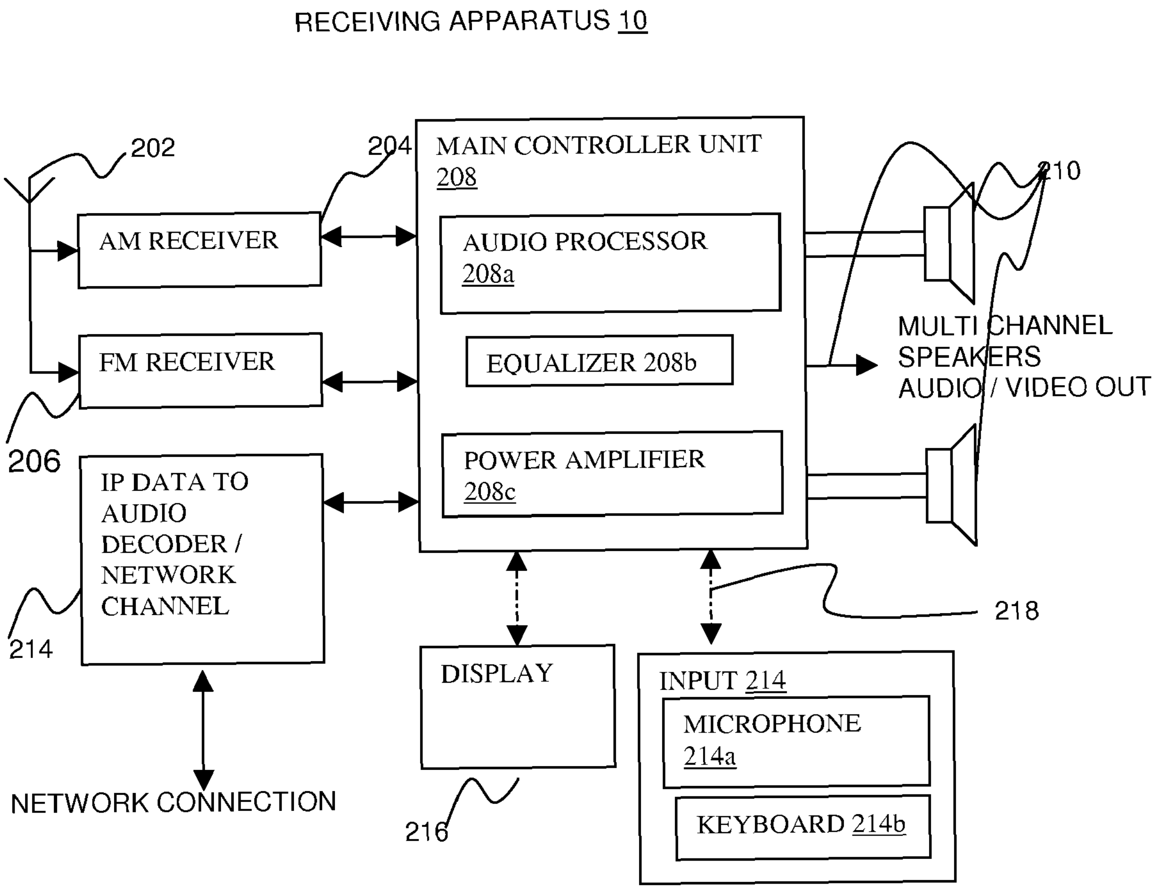
FIG. 2 is a block diagram of one embodiment of the receiving apparatus of FIG. 3.

FIG. 2 is a block diagram of one embodiment of the receiving apparatus 200, which may be an embodiment of receiving apparatus 106. In an embodiment, receiving apparatus 200 is a combination of multiple audio sources including, among other sources, AM receiver 204 and FM receiver 206, which are capable of receiving the free AM and FM public broadcasts, respectively, from antenna 202. Another source of audio signals is a network channel 214, which may receive encrypted audio through an active connection to a network, which may be a Wide Area Network (WAN), such as the Internet, a Local Area Network (LAN) and/or another network.

Main control unit 208 may be a microprocessor and/or microcontroller based controller, which may include one or more peripherals. Main control unit 208 may include audio processor 208*a*, equalizer 208*b*, and/or power amplifier 208*c*. The output of main control unit 208 (which may be the output of power amplifier 208*c*) may be sent to speakers 210. In an embodiment, the user may enter input either through a keyboard 214*b* or through a microphone 214*a*. The user may receive a visual feedback from display 216 (e.g., a graphic display) and can enter a command using a keyboard 214*b*. Display 216 and keyboard 214*b* can be electrically connected to main control unit 208 and/or connected through a wireless means.

Figure 3:
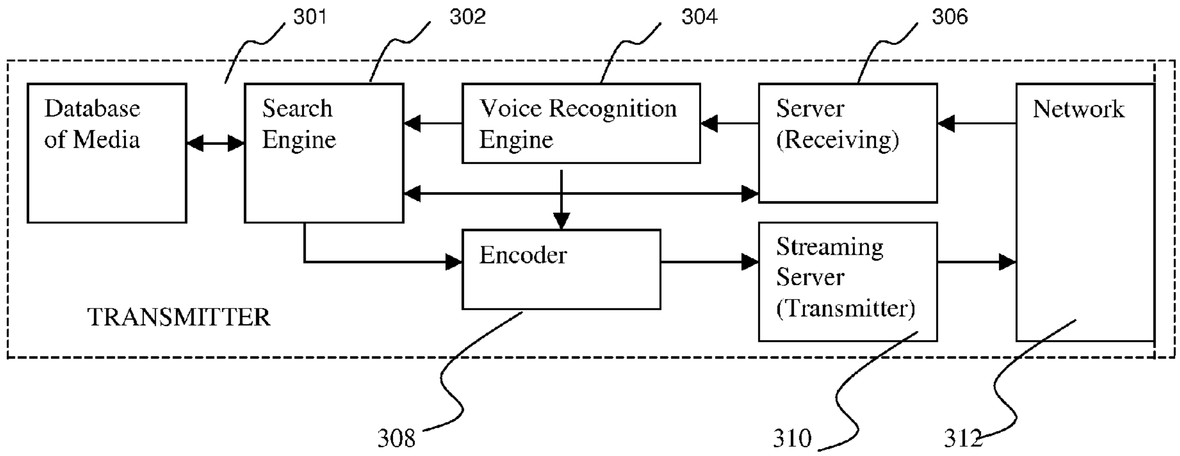
FIG. 3 is a block diagram of one embodiment of a broadcast setup.

FIG. 3 shows a block diagram of the broadcasting setup, which will be referred as broadcast station 300 henceforth in this document. Broadcast station 300 may be hosted on a network 312 (which may be the Internet or any other network). Network 312 is an embodiment of network 104. Broadcast station 300 may be an embodiment of broadcast station 102. Broadcast station 300 may include receiving server 306, which may be capable of receiving commands from all of the connected users.

The broadcast station 300 may also have a voice recognition engine 304, which may be capable of recognizing voice commands from individual users. In an embodiment, voice recognition engine 304 is capable of recognizing any of the voices of any of the users. In an embodiment, voice recognition engine 304 may include a training mode for learning to recognize the voices and voice commands of new users. In an embodiment, voice recognition engine 304 is capable of recognizing voice commands that meet certain criterion that the voices of the users are expected to meet.

Search engine 302 may be capable of finding a suitable match for requests from users, if the match is present within database 301. Search engine 302 may search for records from database 301. If no valid match for the search is found, a negative response is sent back to the user. Database 301 may be a repository of different kinds of media content. Audio transmitted by broadcast station 102 over network 104 may be encrypted using an encoder 308. The encoded audio and associated information is transmitted back to the user through the streaming server 310 over the network 312.

In broadcast station 300, database 301 is searchable by the search engine 302 for different attributes such as by an album, an artist, a genre, a date, a title, a composer, and/or by a category such as talk, audio books, prayer, sports, news, religion, age, language, foreign, and/or by other attributes. The database 301 may be periodically updated with the latest content.

In an embodiment, search engine 302 may obtain (e.g., receiver and/or retrieve) a query from voice recognition engine 304 (e.g., if the user sent the query in the form of a voice command) or from receiving server 306 (e.g., if the command was in the form of any other inputs other than the voice command). If a voice command is received the server decodes the voice command and forwards the voice command to the voice recognition engine 304, which is forwarded to search engine 302. If the receiving server 306 receives a data command, the data command is decoded and forwarded to search engine 302. Receiving server 306 is capable of receiving commands from multiple users through via network 312 (which may be the same as network 104).

The output of a successful search is fed to the encoder 308, which may encrypt the audio content. Encoder 308 may then send the encrypted audio content to streaming server 310 for transmission through network 312. The search results of an individual user may be streamed back to the same user over network 312. Broadcast station 102 is capable of catering to a number of users in parallel with different content being broadcast to each one of the users.

Figure 4:
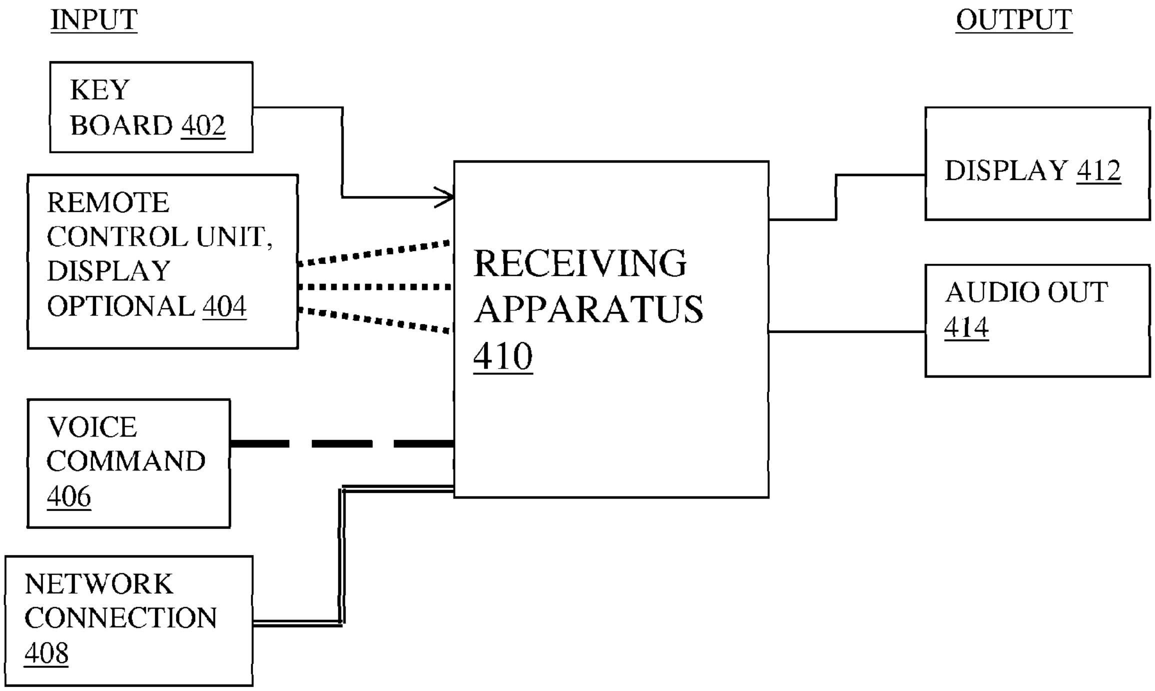
FIG. 4 is an input/output diagram of one embodiment of the receiving apparatus of FIG. 3 or FIG. 1.

FIG. 4 is a block diagram that illustrates examples of user interfaces for receiving apparatus 410, which may be an embodiment of receiving apparatus 200 and/or 106. Receiving apparatus 410 may have keyboard 402 (which may be the same as keyboard 214*a*). Keyboard 402 may be used for entering input for any of the operations of receiving apparatus 410, such as turning the power on, changing the station, changing the volume, changing the treble, searching for a song, searching for a station, searching for an artist, and/or other operations. Receiving apparatus 410 can output user feedback, which may be in the form of text information, such as a volume setting or equalization settings, on display 412 (which may be the same as display 216 or FIG. 2). Display 412 may be electrically connected and mounted on the front panel.

Remote control unit 404 may be a user interface and is optional. Remote control unit 404 may communicate with the receiving apparatus 410 through a wireless communication, using infrared light, ultrasound, radio waves, or other signals. The communications between remote control unit 404 and receiving apparatus 410 may be bi-directional with one another. Remote control unit 404 may include a keypad and a display. The keypad may include alphanumeric keys, navigation keys, and/or other keys. The keys on remote control unit 404 may be equivalent in functionality to keyboard 402. The display on the remote control unit 404 may be equivalent in functionality to the display 412.

The user of receiving apparatus 410 can perform operations using a voice command 406. Receiving apparatus 410 may digitize the voice command, recognize the command with the help of the voice recognition engine 304 (FIG. 3). Receiving apparatus 410 may also produce audible feedback in response to voice commands through main audio out 414.

In an embodiment, receiving apparatus 410 can also be controlled through network connection 408, via a software application or browser. In an embodiment, network connection 408 can only be accomplished after receiving a user authentication from receiving apparatus 410.

Different models of receiving apparatus 410 can have any combination of the inputs and outputs shown in FIG. 4 as long as there is at least a minimum of one valid input (such as front panel keyboard, remote key board, voice command, and network support) and one valid output (such as front panel display and remote display).

Figure 5:
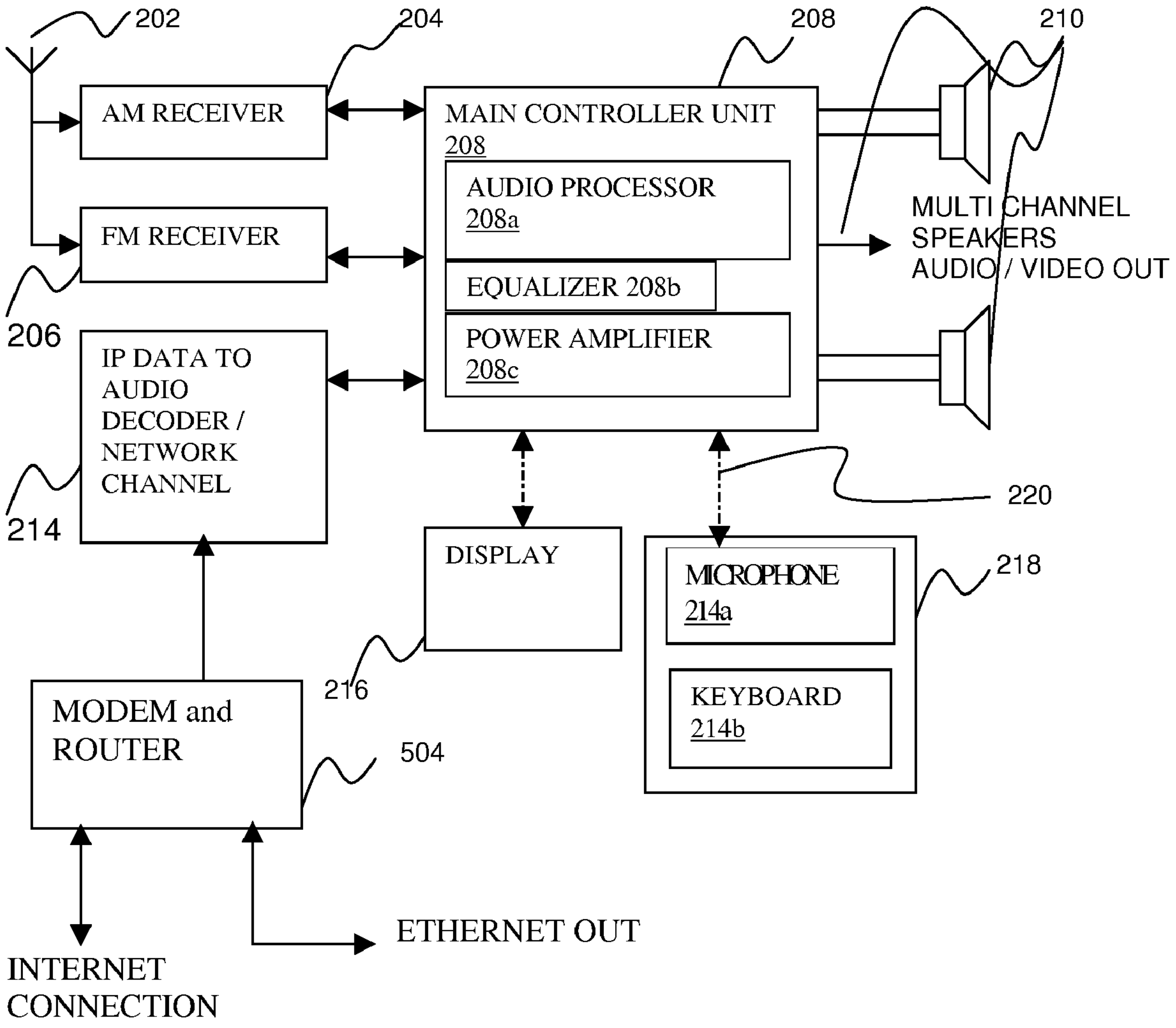
FIG. 5 is a block diagram of another embodiment of the receiving apparatus of FIG. 3.

FIG. 5 depicts a second embodiment of the receiving apparatus 200, which is similar to the embodiment of FIG. 2 except for the addition of broadband modem 504, which is an interface between receiving apparatus 500 to network 104 or 312. Modem 504 may be based on a cable, DSL, wireless, and/or power line connection or other network technologies as long as a broadband connection speed is established. Modem 504 may have a built-in network router so that the output Ethernet port can be used for other networking needs.

Additional embodiments using similar receiving apparatus can be with different kinds of audio content receivers, such as the Digital Audio Broadcast (DAB) or the satellite radio along with the AM, FM, and/or network channel 212. In another embodiment, a television receiver may be included in addition to, or instead of, a radio tuner and capability to receive video in addition to, or instead of, the audio explained above.

In another embodiment, receiving apparatus 200 may have a single network channel 408, without the free broadcast for users just interested in on-demand audio. In another embodiment, receiving apparatus 200 has a wireless network receiver, and may be used in a vehicle, installed in a vehicle, and/or made into a portable gadget, which can be used in the area where the wireless network is covered.

Figure 6:
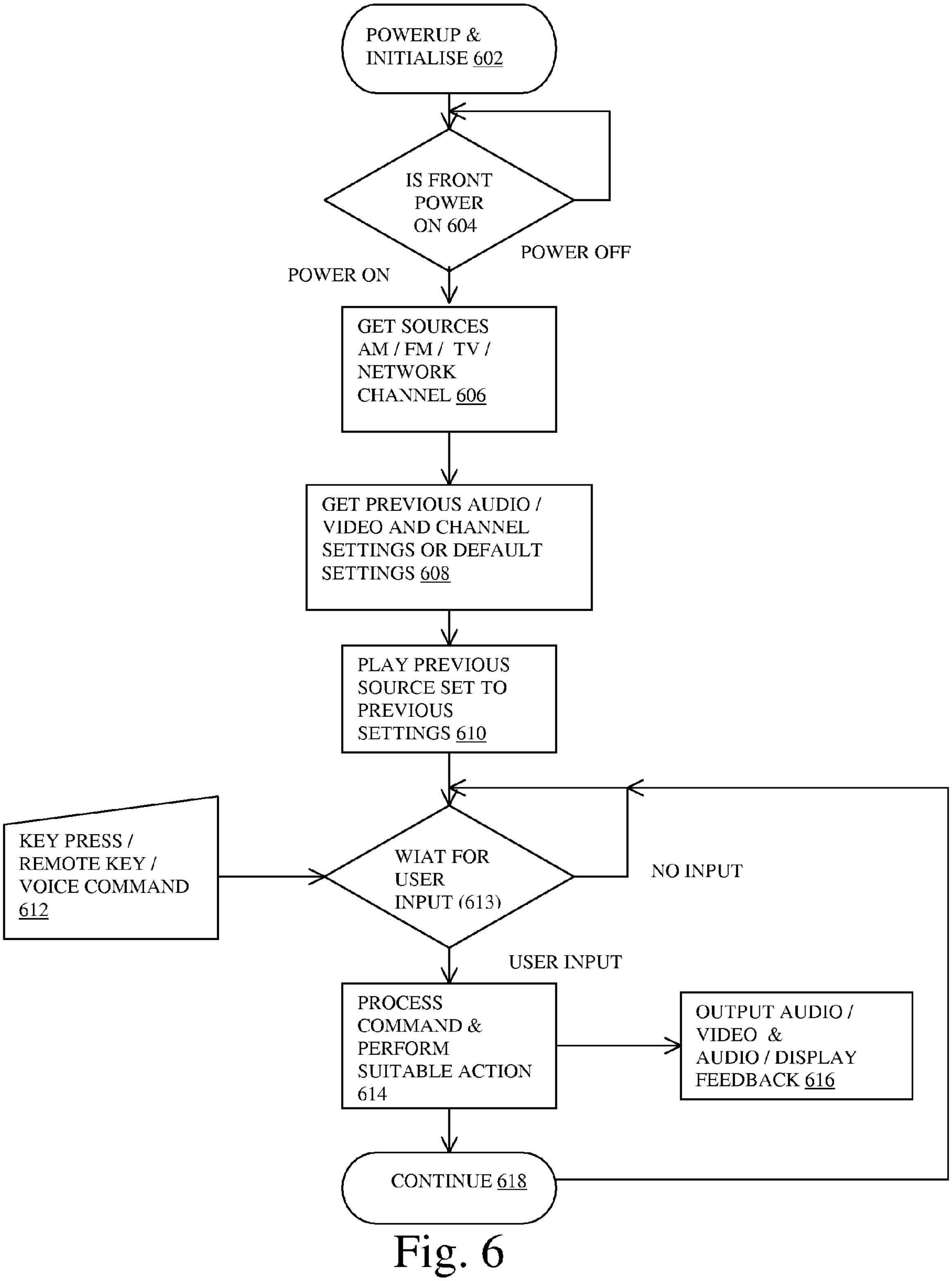
FIG. 6 is a flowchart of one embodiment of a method of operating the receiving apparatus.

FIG. 6 shows a flowchart of an example of method 600 of operating of the receiving apparatus 106, 200, 410, or 500. In step 602, power is applied. Upon turning on the power, internal power supplies are turned on, the hardware is initialized, and network connections are established. In step 604, receiving apparatus 106, 200, 410, or 500 checks if the power switch is on. Receiving apparatus 106, 200, 410, or 500 loops around, repeating step 604, waiting for the front power switch to be turned ON. The power switch may be turned on through a front panel key or remote key press or a voice command as shown in FIG. 4. Once the front power is turned ON, method 600 proceeds to step 606. In step 606, microcontroller 208 in receiving apparatus 200 checks for all the available audio sources. In the embodiment of FIG. 2, the sources received may be AM receiver 206, FM receiver 208, and network channel 214.

After finding the available sources, in step 606, receiving apparatus 200 gets the previously tuned channel information and the equalizer settings from the non-volatile memory of main control unit 208. Receiving apparatus 106, 200, 410, or 500 then tunes to the previous channel and audio settings. For example, if the apparatus was tuned to 98.5 FM, the volume was set to midrange, and the equalization set to flat before powering down, then receiving apparatus 106, 200, 410, or 500 may tune back to 98.5 FM with the volume set to midrange and the flat equalization the next time receiving apparatus 106, 200, 410, or 500 is turned on. A similar operation may be performed if AM or network channel was the previously tuned channel. If the contents of the non-volatile RAM are not valid, then the apparatus tunes to a default pre-decided channel.

When receiving apparatus 106, 200, 410, or 500 is up and running, an user input, using any of the valid input devices 402, 404, 406 or 408 is shown in step 612. The step 613 will wait for any user input. On receiving a user input, the input command is forwarded to step 614 for processing. Any change caused due to the user input 612 is shown in the output 616 through the one or all the output devices 412 or 414. If there is no user input in step 613, the software waits for the next user command while continuing to play the same source as in step 610. For example, if the command is one that causes a change of bands (e.g., a change of stations), receiving apparatus 200 may change bands in a particular sequence, such as AM->FM ->Network Channel ->AM, cycling through the available sources. Other commands, such as commands that change the volume and/or equalization, are processed by audio processor 208*a*, equalizer 208*b*, and/or power amplifier 208*c* in main control unit 208. Receiving apparatus 106, 200, 410, or 500 will tune to previously tuned frequency in the case of AM or FM or to the previously played network channel 214. After Processing the command in step 614, the flow continues (618) to wait for the next user input.

Figure 7:
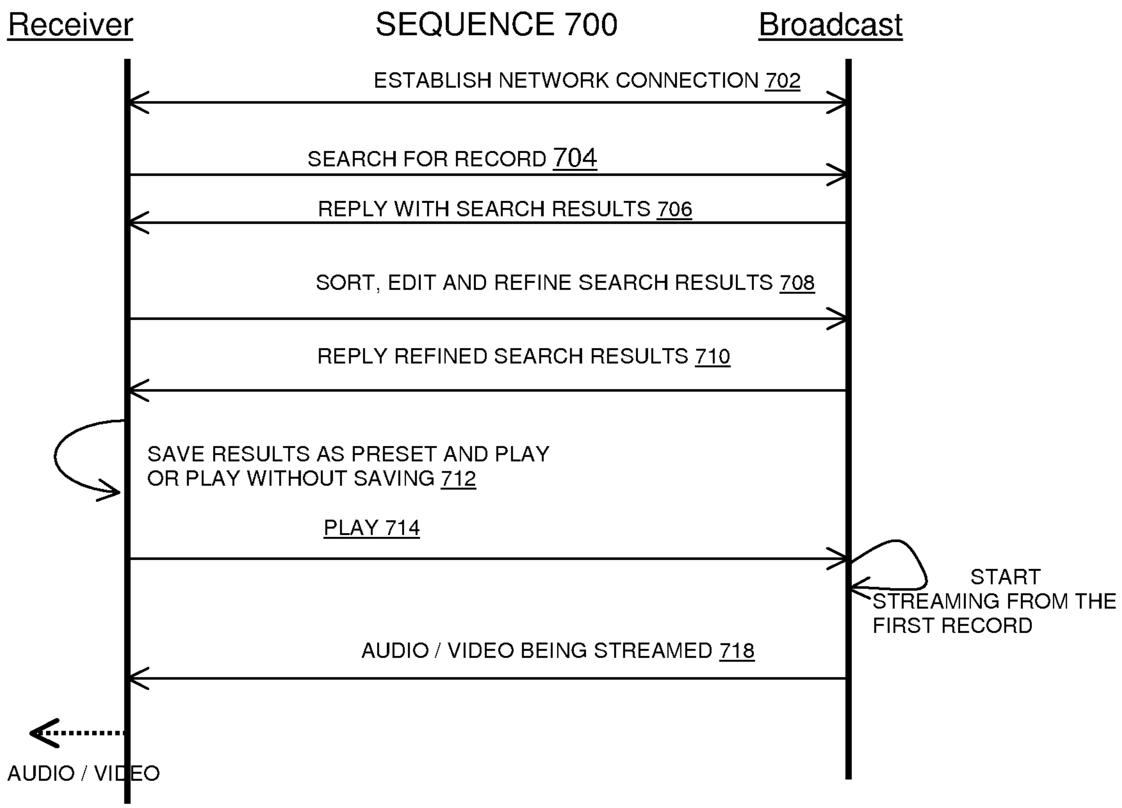
FIG. 7 is a sequence diagram of one embodiment of a search and play on the network channel.

FIG. 7 shows a diagram of an embodiment of a sequence 700 of an event related to setting up a network channel using a simple search. During sequence 700 audio may be received and presets may be set up. A network connection is established during event 702. Any attribute or keyword searched for, using any of the valid Input devices in FIG. 4, may be transmitted to broadcast station 102 or 300 over the network 312. A search is conducted for records during event 704. As part of event 704, search engine 302 in broadcast station 102 or 300 may search for one or more attributes in database 301. A reply with search results is received at event 706. As part of event 706, a list of all matched records may be transmitted back to receiving apparatus 200 over the network 312. The search results may be sorted, edited and the search may be refined at event 708. In event 708, the search results displayed can be sorted by date, rating etc. Individual records in the result can be selected for removed.

Refined search results are received at event 710. The results may be saved as presets and played or the results may be played without saving as presets at event 712. Once the list is edited it can be saved as a preset with a user given name. The preset enables the user to replay the list of records without having to search again. The preset may be periodically refreshed for new updates without the user's interference. For example, if the query is "Today's Sports News," the search result may be updated periodically for the latest sports news. Next the user may choose to play a song at event 714 (which may have been preset earlier at step 712). On selecting a preset network channel, the results of the search may be streamed from the broadcasting server to receiving apparatus 106, 200, 410, or 500. The records that make up the item selected for playing may be streamed at event 718. Receiving apparatus 106, 200, 410, or 500 decodes and plays the streamed media. The user may be able to narrow down his or her search, by searching within the search results.

Receiving apparatus 200 may include a number of default presets. Some examples of default presets are "Best of POP," "News Update," "Sports News," etc. A preset by a user may be saved as a play list at broadcast station 102 or 300. A play list is a list of all the records matching the search criteria, in an user selected sequence. When a play list is selected, the list of records is streamed from the top of the list to the bottom. Commercials and advertisements can be introduced between two consecutive records for users who do not pay a subscription fee, whereas uninterrupted audio may be streamed to users that pay a subscription fee.

Each embodiment disclosed herein may be used or otherwise combined with any of the other embodiments disclosed. Any element of any embodiment may be used in any embodiment.

Although the invention has been described with reference to specific embodiments, it will be understood by those skilled in the art that various changes may be made and equivalents may be substituted for elements thereof without departing from the true spirit and scope of the invention. In addition, modifications may be made without departing from the essential teachings of the invention.

The invention claimed is:

1. A hardware system comprising: a receiver apparatus having a tuner that tunes to one or more AM and FM broadcast channels having a network interface that accesses content via a network, the network interface including at least a modem, and having an audio processor circuit and speaker, the audio processor circuit being configured to play audio content from user requested content that is accessed via the network, wherein the receiving apparatus is configured such that the playing is performed immediately upon a request for the content from the network, and wherein the user requested content is determined based on one or more user inputted search terms;

a machine readable medium storing one or more machine instructions, which when implemented cause the receiving apparatus to associate different equalization settings with different items in the playlist and storing the equalization settings with the playlist.

2. The hardware system of claim 1, including machine instructions stored on a storage medium which when implemented cause the receiver apparatus to receive non-subscription users receive audio content having commercials inserted between audio clips if the user is a non-subscription user, and receive uninterrupted audio content if the user is a subscription user.

3. The hardware system of claim 1, further including broadcast station including a transmitter apparatus having a machine readable medium storing one or more machine instructions for monitoring how many times a particular record is played.

4. The hardware system of claim 3, wherein the one or more machine instructions when implemented cause a machine to compute royalties based on a popularity of a selected record.

5. The hardware system of claim 1, wherein the receiver apparatus includes at least a radio receiver.

6. The hardware system of claim 1, wherein the receiver apparatus includes at least a storage medium storing machine instructions for an internet-protocol data to audio decoder which when implemented causes a processor to receive and decode audio content from a network.

7. The hardware system of claim 1, further comprising one or more multi channel speaker outputs that play the audio content.

8. The hardware system of claim 1, the content including video content, further comprising one or more displays that play the video content.

9. The hardware system of claim 1, further comprising a keyboard, a voice input circuit, and a display for displaying information indicative of a source of the audio content.

10. The hardware system of claim 1, further comprising a broadcast station including at least a database of media;

machine instructions stored on a machine readable media, which when implemented causes the broadcast station to implement a search engine for searching the database for audio content;

machine instructions stored on a machine readable media which when implemented causes the broadcast station to implement a voice recognition engine;

machine instructions stored on a machine readable media, which when implemented causes the broadcast station to implement an encoder for encoding the audio content; machine instructions stored on a machine readable media, which when implemented causes the broadcast station to implement a receiving server for receiving a request for audio content; and machine instructions stored on a machine readable media, which when implemented causes the broadcast station to implement a streaming server for streaming the audio content that was encoded by the encoder.

11. The hardware system of claim 1, the receiving apparatus being a portable network radio.

12. The hardware system of claim 1, including a machine readable medium storing one or more machine instructions, which when implemented causes the receiving apparatus to create a user defined network broadcast channel.

13. The hardware system of claim 1, wherein the receiver apparatus includes a machine readable medium storing one or more instructions that causes the receiver apparatus to send signals to a network based broadcast station to establish a play list based on the one or more user inputted search terms.

14. A hardware system comprising: a receiver apparatus having a tuner for tuning to one or more broadcast channels having a network interface for accessing audio content via a network, and having an audio processor circuit and speaker, the audio processor circuit being configured to play audio content that is accessed via a network, wherein the receiving apparatus is configured such that the playing is performed immediately upon a request for the content; the hardware system, including one or more machine instructions stored on one or more machine readable media for causing the receiver apparatus to automatically upgrade software while the system is not being used wherein the receiver apparatus further includes a machine readable medium storing one or more instructions that causes the receiver apparatus to send signals to a broadcast station to establish a play list based on the requested content; and wherein the playlist is a list of the requested content matching criteria of the search terms, in the user's selected sequence.

15. A hardware system comprising: a receiver apparatus having a tuner that tunes to one or more AM and FM broadcast channels having a network interface that accesses content via a network, the network interface including at least a modem, and having an audio processor circuit and speaker, the audio processor circuit being configured to play audio content from user requested content that is accessed via the network, wherein the receiving apparatus is configured such that the playing is performed immediately upon a request for the content from the network, and wherein the user requested content is determined based on one or more user inputted search terms; wherein the receiver apparatus includes at least a hardware controller unit having at least an equalizer, and power amplifier circuit.

16. A hardware system comprising: a receiver apparatus having a tuner for tuning to one or more broadcast channels having a network interface for accessing audio content via a network, and having an audio processor circuit and speaker for playing audio content that is accessed via a network, wherein the receiving apparatus is configured such that the playing is performed immediately upon a request for the content; wherein the requested content is determined based on one or more user inputted search terms;

wherein the search terms include at least database attributes or keywords;

wherein the receiver apparatus further includes a machine readable medium storing one or more instructions that causes the receiver apparatus to send signals to a broadcast station to establish a play list based on the requested content; and wherein the playlist is a list of the requested content matching criteria of the search terms, in the user's selected sequence.

17. The hardware system of claim 16, wherein the audio content includes at least the play list.

18. A method comprising:

receiving via a receiving apparatus a request for audio content based on a series of user inputted search terms;

wherein the search terms comprise database attributes or keywords; and in response to the receiving, the receiving apparatus automatically finding one or more sources for the audio content within one or more networks, the receiving apparatus automatically playing the audio content returned from a broadcast station selected by a user within the one or more networks; and wherein the one or more networks include a Wide Area Network (WAN) or Local Area Network (LAN).

19. The method of claim 18, wherein the playing includes at least amplifying, via an amplifying circuit, a signal containing the audio content; and equalizing the signal containing the audio content, via the receiving apparatus implementing machine instructions stored on a machine readable medium.

20. A method comprising:

receiving via a receiving apparatus a request for audio content; and in response to the receiving, the receiving apparatus automatically finding a source for the audio content within a network, the receiving apparatus automatically playing the audio content;

the method further comprising the receiving apparatus sending a request to create a play list to a transmitter apparatus at a broadcast station;

wherein the playlist is a list of the requested audio content matching criteria of the request, in a user's selected sequence;

wherein the request is based on one or more user inputted search terms; and wherein the search terms comprise database attributes or keywords.

21. The method of claim 18, further comprising the receiving apparatus sending a request to a broadcast station to play a play list that is based on the series of search terms.

22. A hardware system comprising: a receiver apparatus having a tuner that tunes to one or more AM and FM broadcast channels having a network interface that accesses content via a network, the network interface including at least a modem, and having an audio processor circuit and speaker, the audio processor circuit being configured to play audio content from user requested content that is accessed via the network, wherein the receiving apparatus is configured such that the playing is performed immediately upon a request for the content from the network, and wherein the user requested content is determined based on one or more user inputted search terms; including one or more machine instructions stored on one or more machine readable media for causing the receiver apparatus to automatically upgrade software while the system is not being used.

23. A hardware system comprising:

a receiver apparatus having a tuner for tuning to one or more broadcast channels having a network interface for accessing audio content via a network, and having an audio processor circuit and speaker for playing audio content that is accessed via a network, wherein the receiving apparatus is configured such that the playing is performed immediately upon a request for the content;

wherein the receiver apparatus includes a machine readable medium storing one or more instructions that causes the receiver apparatus to send signals to a broadcast station to establish a play list;

wherein the audio content includes at least the play list;

the hardware system further including a machine readable medium storing one or more machine instructions, which when implemented cause the receiving apparatus to associate different equalization settings with different items in the playlist and storing the equalization settings with the playlist.

* * * * *